US010211020B2

(12) United States Patent
Tieman

(10) Patent No.: US 10,211,020 B2
(45) Date of Patent: Feb. 19, 2019

(54) SELF-POWERED WIRELESS FUSE SWITCH

(71) Applicant: Tieman Vehicle Technologies LLC, Westfield, IN (US)

(72) Inventor: Craig A. Tieman, Westfield, IN (US)

(73) Assignee: Blue Eclipse, LLC, Westfield, IN (US)

( * ) Notice: Subject to any disclaimer, the term of this patent is extended or adjusted under 35 U.S.C. 154(b) by 92 days.

(21) Appl. No.: 15/297,700

(22) Filed: Oct. 19, 2016

(65) Prior Publication Data

US 2017/0036621 A1    Feb. 9, 2017

Related U.S. Application Data

(63) Continuation-in-part of application No. 14/573,394, filed on Dec. 17, 2014, now Pat. No. 9,475,459.
(Continued)

(51) Int. Cl.
*H01H 85/20* (2006.01)
*H01H 85/46* (2006.01)
*H01H 85/045* (2006.01)
*B60R 25/045* (2013.01)
*H01H 47/00* (2006.01)
(Continued)

(52) U.S. Cl.
CPC ....... *H01H 85/2015* (2013.01); *B60R 25/045* (2013.01); *H01H 47/002* (2013.01); *H01H 51/27* (2013.01); *H01H 85/0456* (2013.01); *H01H 85/46* (2013.01); *B60R 2325/205* (2013.01); *H01H 85/0417* (2013.01); *H01H 2085/466* (2013.01); *H04W 88/02* (2013.01)

(58) Field of Classification Search
None
See application file for complete search history.

(56) References Cited

U.S. PATENT DOCUMENTS 3,629,766 A * 12/1971 Gould, Jr. .............. H01H 71/20
                                                        337/239
4,347,504 A    8/1982 Murofushi
(Continued)

OTHER PUBLICATIONS

International Search Report and Written Opinion for International Application No. PCT/US2017/056943 dated Jan. 16, 2018.
(Continued)

*Primary Examiner* — Tamara L Weber
(74) *Attorney, Agent, or Firm* — Andrus Intellectual Property Law, LLP

(57) ABSTRACT

A self-powered wireless fuse switch is disclosed that is a plug-in replacement for a fuse found in the electrical system of vehicles. The self-powered wireless fuse adds remote-controlled switching capabilities for short and long-range control of power to subsystems of a vehicle electrical system. The wireless fuse switch includes a wireless control module having an internal power supply and an internal transceiver that receives commands from a remote control unit. A separate fuse module includes an outer housing and fuse blades that extend from the outer housing and interface with a fuse socket of the vehicle to selectively allow or interrupt power from the vehicle to the subsystem of the vehicle electrical system. The fuse module includes a fusible link, a relay controller and a relay in the outer housing. The fuse module receives power from and communicates with the wireless control module.

14 Claims, 10 Drawing Sheets

Related U.S. Application Data

(60) Provisional application No. 61/921,414, filed on Dec. 28, 2013.

(51) Int. Cl.
*H01H 51/27* (2006.01)
*H04W 88/02* (2009.01)
*H01H 85/041* (2006.01)

(56) References Cited

U.S. PATENT DOCUMENTS

| | | |
|---|---|---|
| 5,251,093 A | 10/1993 | Dickey |
| 5,619,074 A | 4/1997 | Berch et al. |
| 5,986,350 A | 11/1999 | Hirano |
| 6,611,201 B1 | 8/2003 | Bishop |
| 6,784,567 B1 | 8/2004 | Klitzner |
| 7,132,762 B2 | 11/2006 | Metlitzky et al. |
| 7,132,934 B2 | 11/2006 | Allison |
| 7,135,788 B2 | 11/2006 | Metlitzky et al. |
| 7,266,507 B2 | 9/2007 | Simon |
| 7,530,851 B2 | 5/2009 | Parnis |
| 8,041,779 B2 | 10/2011 | Habaguchi |
| 8,239,076 B2 | 8/2012 | McGarry |
| 8,912,687 B2 | 12/2014 | Kesler |
| 9,026,267 B2 | 5/2015 | Schwarz |
| 9,047,494 B1 | 6/2015 | Smith |
| 2002/0057542 A1* | 5/2002 | Colling .......... B60K 28/14 361/52 |
| 2004/0189493 A1 | 9/2004 | Estus et al. |
| 2006/0089050 A1 | 4/2006 | Smith |
| 2007/0026738 A1 | 2/2007 | Eichman |
| 2007/0085418 A1 | 4/2007 | Casellato |
| 2010/0073119 A1 | 3/2010 | Titokis |
| 2011/0018441 A1* | 1/2011 | Tanaka .......... B60Q 1/0094 315/82 |
| 2011/0215900 A1 | 9/2011 | Corradino |
| 2011/0309680 A1 | 12/2011 | Oleksiewicz |
| 2012/0112531 A1 | 5/2012 | Kesler |
| 2013/0203365 A1 | 8/2013 | Tieman |
| 2014/0354045 A1 | 12/2014 | Snider |
| 2014/0376142 A1 | 12/2014 | Luebke |

OTHER PUBLICATIONS

International Search Report for PCT/US14/71509 dated Apr. 16, 2015.
Written Opinion for PCT/US14/71509 dated Apr. 16, 2015.
Extended European Search Report for European Patent Application No. 14875472.4 dated Jun. 13, 2017.

* cited by examiner

SELF-POWERED WIRELESS FUSE SWITCH

CROSS-REFERENCE TO RELATED APPLICATION

The present application is a continuation-in-part (CIP) application that claims priority to U.S. patent application Ser. No. 14/573,394 filed on Dec. 17, 2014, now issued as U.S. Pat. No. 9,475,459, which in turn is based on and claims priority to U.S. Provisional Patent Application Ser. No. 61/921,414 filed Dec. 28, 2013, the disclosures of which are both incorporated herein by reference.

BACKGROUND

This present disclosure generally relates to a fuse-protected vehicle electrical system. More specifically, the present disclosure relates to wireless connectivity enhancements of a singular design which can be added to existing vehicle electrical systems without special tools or training to permit external control of at least one electrical subsystem through a wireless link to mobile control devices.

Electrical and electronic subsystems in automotive vehicles are part of the overall vehicle electrical system and provide numerous functions related to the normal starting and driving operation, convenience, entertainment, access and security for vehicles. Every year, vehicle manufacturers introduce vehicles with increasing numbers of features which enhance convenience, entertainment, access and security. In addition, thieves continually attempt to learn how to circumvent vehicle security systems in an attempt to steal vehicles, which makes all vehicles vulnerable to theft despite the sophistication of their original electronic equipment. Vehicles which have been manufactured and sold have specific features that will always remain the same over time and will not benefit from the introduction of enhanced features that new vehicles enjoy.

In recent years, the rapid and widespread growth in long-range wireless connectivity and sophisticated hand-held mobile devices with touch-type graphical user interfaces and short or long-range wireless connectivity has led to the proliferation of machine-to-machine connectivity solutions and "anywhere at any time" device interactivity. Consumers now expect all of their vehicles, homes and devices to be connected and able to be interacted with via their mobile technology from anywhere and at any time.

For many years, aftermarket vehicle electronics suppliers have been offering retrofittable security and convenience subsystems to expand the capabilities available to vehicle owners. Security system enhancements are available to enhance the existing vehicle security features through connections to existing vehicle electronic systems to override normal operation and create greater barriers to thieves who must overcome these systems to steal a vehicle. Other aftermarket system enhancements include the addition of remote vehicle start and keyless entry. The primary limitations of these systems include the need for extensive custom engineering efforts by the suppliers for each vehicle to work with the unique electronics of the vehicles as well as the need for consumers to pay a professional technician for all installation efforts due to the technical complexity of the different vehicle installations. Consequently, these installations are generally expensive for consumers to consider.

One aftermarket supplier, Dynamco of Australia, offers a plug-in wireless relay replacement to enable RF control of vehicle systems. This system includes a relay that does not have self-powering and must obtain power from the relay socket, if power is available at this location. In many vehicles, the relay socket does not supply the necessary power and in those cases, additional wires must be run to obtain power and/or ground from the vehicle to operate. Additionally, there are many different relay configurations in vehicles, which requires a wide variety of part numbers and individual relays to address the vehicle market. Also, there are a large number of vehicles which do not have user-replaceable relays to use for adding wireless connectivity via a wireless relay replacement.

Presently, no wireless connectivity enhancement system of a singular design to control a fuse-protected vehicle system, which is self-powered and controlled by mobile devices, of all existing or new vehicles and devices for installation without special tools or training currently exists.

SUMMARY

The present disclosure relates to a self-powered wireless fuse switch that is a plug-in replacement for a fuse, typically found in vehicles, which would add a remote-controlled switch for short and long-range control of power to vehicle subsystems (e.g. disable engine start, disable ignition or fuel pump, enable remote starting). A wireless control module contains a power source (replaceable battery) which operates an internal radio frequency (RF) transceiver and battery monitor for communicating with an external RF transceiver. The external RF transceiver represents part of a separate control device, such as a smart phone. The internal RF transceiver of the wireless control module receives control commands and passes the control commands to a separate fuse module that includes a controller to operate a relay contained in the fuse module. The relay is connected in series with a fusible link between a vehicle battery and vehicle subsystem being controlled by the separate controlling system. Automotive fuses come in various sizes and connector pin configurations but all serve the same purpose: to protect wiring from overcurrents due to short circuits. To address this with a singular design, the fuse module can have either a two blade or three blade design to be received within a matching fuse socket to accept the original fuse being replaced. The separate control device can be either a mobile device with a short-range RF transceiver or a gateway telematics device which extends the range of the wireless switch module to reach a remotely-located mobile device.

In accordance with the present disclosure, the fuse module is a separate element and is in communication with the wireless control module through a wired or wireless connection. The fuse module includes an outer housing and a plurality of fuse blades that extend from the outer housing for receipt in a fuse socket. The fuse module further includes a relay controller and a relay both contained within the outer housing. The relay controller operates to move the relay between an open position and a closed position based upon control commands that are received from the control device. In this manner, the fuse module is able to open and close a relay to control operation of the electrical subsystem that receives power from the vehicle battery through the fuse socket that receives the fuse module. The fuse module further includes a fusible link that can open upon an overcurrent draw through the fuse module.

The fuse module of the present disclosure receives control commands and power from the wireless control module. Since the internal power supply and transceiver are not contained within the outer housing of the fuse module, the fuse module can be of a size to fit within the fuse panel of a vehicle.

Accordingly, this system could be used by any user with simple instructions to replace an existing vehicle fuse with a remotely-controlled wireless fuse switch which will permit the vehicle owner to remotely deactivate or deactivate the power for various vehicle electrical and electronic functions. Remote control can be extended to the user's mobile devices over wireless links to provide short to long-range control.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
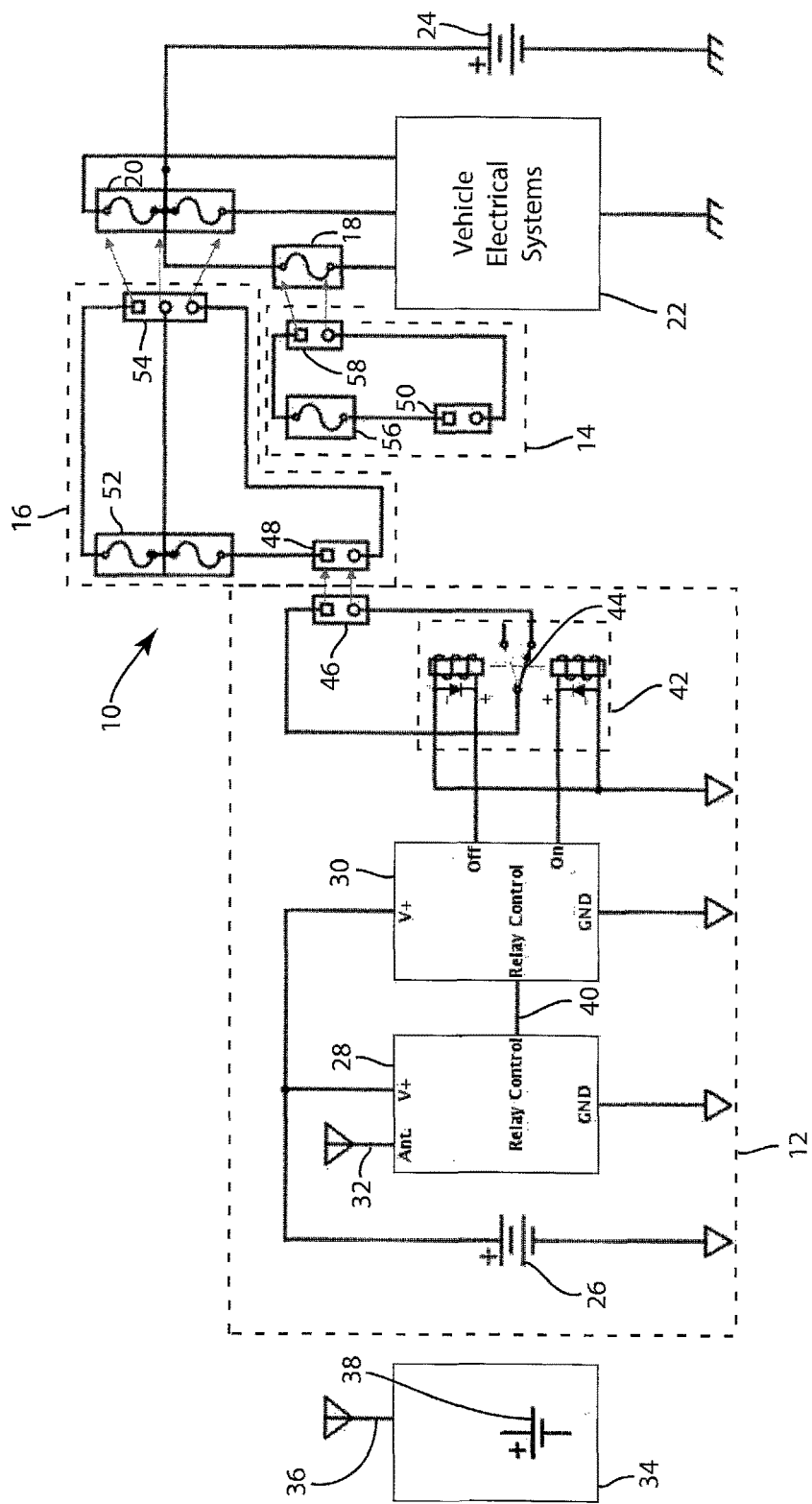
FIG. 1 is a schematic diagram showing the components of the self-powered wireless fuse switch.

FIG. 1 is a schematic diagram of a self-powered, wireless fuse switch 10 constructed in accordance with the present disclosure. The wireless fuse switch 10 includes a wireless control module 12 that interfaces with either a two-blade harness assembly 14 or a three-blade harness assembly 16. The two-blade and three-blade harness assemblies 14, 16, respectively, allow the wireless fuse switch 10 to interface with either a two-blade fuse socket 18 or a three-blade fuse socket 20 of a vehicle electrical system 22. As shown in FIG. 1, both the two-blade fuse socket 18 and the three-blade fuse socket 20 are positioned between the vehicle electrical system 22 and the vehicle battery 24. The vehicle electrical system 22 includes a plurality of electrical subsystems, such as a keyless entry system, a remote starting system or other similar systems within the vehicle. The wireless fuse switch 10, by utilizing either the two-blade harness assembly 14 or the three-blade harness assembly 16, can be connected to the vehicle electrical system 22 through one of the respective two-blade sockets 18 or the three-blade socket 20. Although a single two-blade fuse socket 18 and a single three-blade fuse socket 20 are shown in FIG. 1, it should be understood that the vehicle can and typically will include multiple two-blade and three-blade sockets, where each of the sockets are connected between the vehicle battery 24 and one of the respective electrical subsystems. The two-blade fuse socket 18 receives a two-blade vehicle fuse while the three-blade fuse socket 20 receives a three-blade fuse.

The wireless control module 12 includes an internal battery 26 that provides power for the internal operating components contained within the wireless control module 12. The battery 26 provides power for both an RF transceiver and battery monitor 28 and a relay controller 30. The RF transceiver 28 includes an antenna 32 that can receive wireless control signals from an external control device 34. In the embodiment illustrated, the control device 34 may be a wireless mobile device, such as a smart phone, that includes an internal RF transceiver that is able to transmit wireless control signals through an antenna 36. The control device 34 includes a graphical user interface and an internal battery 38 that provides the operating power necessary to transmit wireless control signals from the control device 34 to the wireless control module 12. Although the control device 34 is shown as being a separate user operable device, in an alternate embodiment, the control device 34 may be a gateway device with an RF transceiver located within the vehicle that communicates wirelessly to the RF transceiver 28 contained within the wireless control module 12.

When the RF transceiver 28 contained within the wireless control module 12 receives a control signal from the control device 34, the RF transceiver 28 communicates to the relay controller 30 through control line 40. When the relay controller 30 receives a control signal along line 40, the relay controller 30 can control operation of a relay 42. In the embodiment shown, the relay 42 is a bi-stable latching relay that only requires power briefly to transition to the commanded position (open/closed) and holds the commanded position indefinitely without the application of any additional power. The use of the bi-stable latching relay allows the relay 42 to maintain the commanded position without the need for additional power draw from the internal battery 26. In the embodiment shown in FIG. 1, the internal switching contact element 44 is shown in a closed position. The operation of the relay controller 30 to transmit control signals to the relay 42 is well known.

As illustrated in FIG. 1, the wireless control module 12 further includes a module connector 46 that allows the wireless control module 12 to be connected to either the two-blade harness assembly 14 or the three-blade harness assembly 16. In the embodiment shown, the module connector 46 is connected to the harness connector 48 of the three-blade harness assembly 16. A similar harness connector 50 is included in the two-blade harness assembly 14 such that the wireless control module 12 can be connected to either of the harness assemblies 14 or 16.

The three-blade harness assembly 16 further includes the harness fuse socket 52 that is configured to receive a three-blade fuse. The harness fuse socket 52 is similar to the three-blade fuse socket 20 included as part of the vehicle electrical system. The harness fuse socket 52 is configured to receive the conventional three-blade fuse that is removed from the three-blade socket 20 during installation of the wireless fuse switch 10 of the present disclosure.

The three-blade harness assembly 16 further includes a fuse connector 54 sized to be received within the three-blade socket 20 of the vehicle electrical system. In this manner, the combination of the wireless control module 12 and three-blade housing assembly 16 can be installed into the three-blade socket 20 of the vehicle electrical system.

As described previously, the wireless fuse switch 10 can alternatively include the two-blade harness assembly 14. The two-blade harness assembly 14 includes a harness fuse socket 56 and a fuse connector 58. The harness fuse socket 56 is configured to receive a two-blade fuse removed from the two-blade fuse socket 18 during installation of the wireless fuse switch 10. The fuse connector 58 allows the two-blade harness assembly 14 to be connected directly to the two-blade fuse socket 18 of the vehicle electronics system.

Figure 2A:
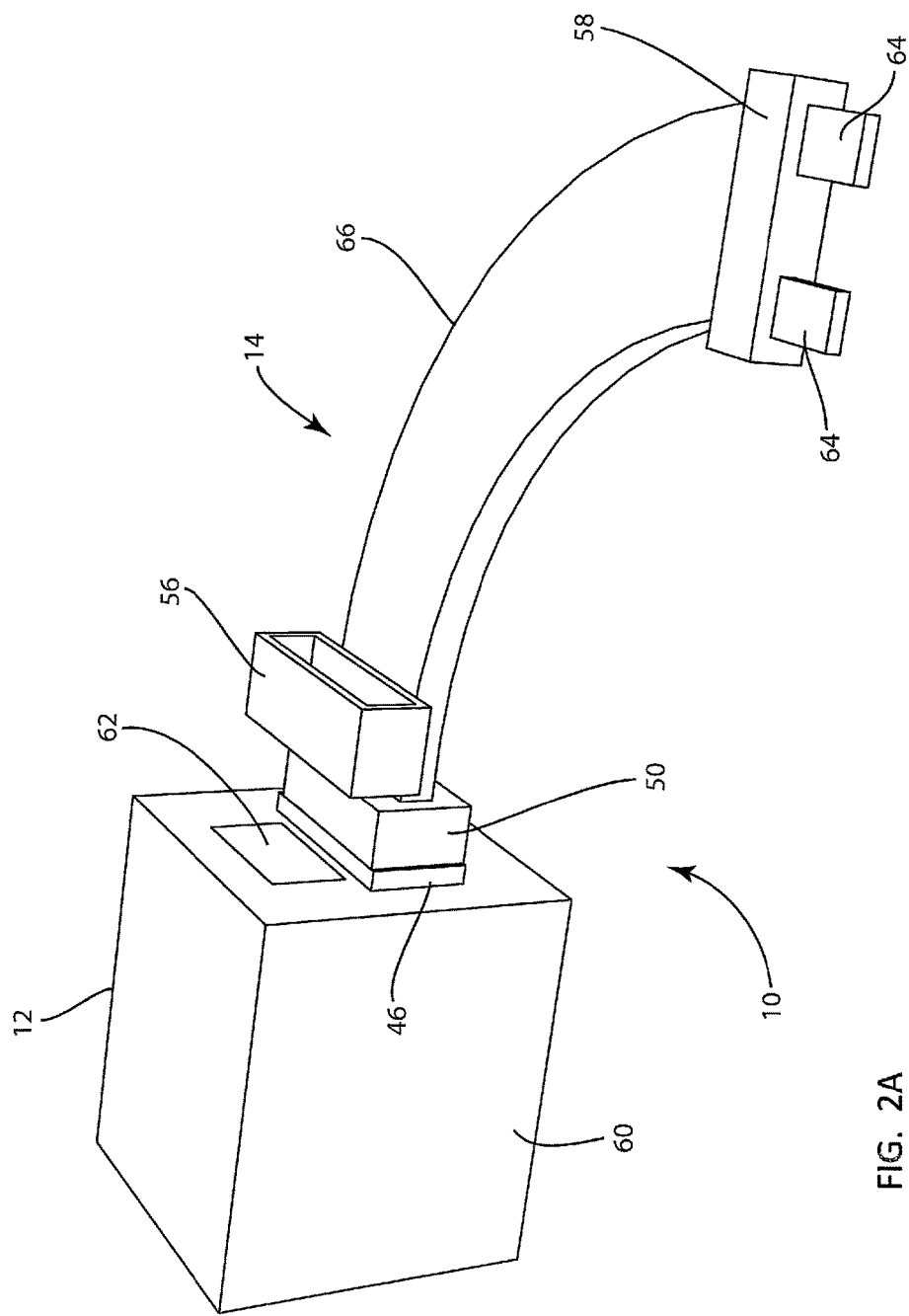
FIG. 2A is an isometric view of the self-powered wireless fuse switch including a two-blade harness assembly.

FIG. 2A illustrates an isometric view of the wireless fuse switch 10 in an embodiment in which it is configured for receipt within the two-blade fuse socket of the vehicle electrical system. As illustrated in FIG. 2A, the wireless fuse switch 10 includes the wireless control module 12 and the two-blade harness assembly 14. The wireless control module 12 includes an outer housing 60 having a battery access cover 62. The two-blade harness assembly 14 includes the fuse connector 58 that includes a pair of blades 64 that allows the fuse connector 58 to be received within the two-blade socket 18 of the vehicle electrical system. The fuse connector 58 in the embodiment shown in FIG. 2A includes an extended harness cable 66 that includes at its opposite end, the harness connector 50. The harness connector 50, in turn, is received within the module connector 46.

The two-blade harness assembly 14 further includes the harness fuse socket 56 that can receive the two-blade fuse removed from the vehicle electrical system. In this way, the two-blade harness assembly 14 provides for over current protection by utilizing the fuse that forms part of the vehicle electrical system. The wireless fuse switch 10 thus replaces the fuse within the vehicle electrical system and provides for enhanced functionality, as will be described in greater detail below.

Figure 2B:
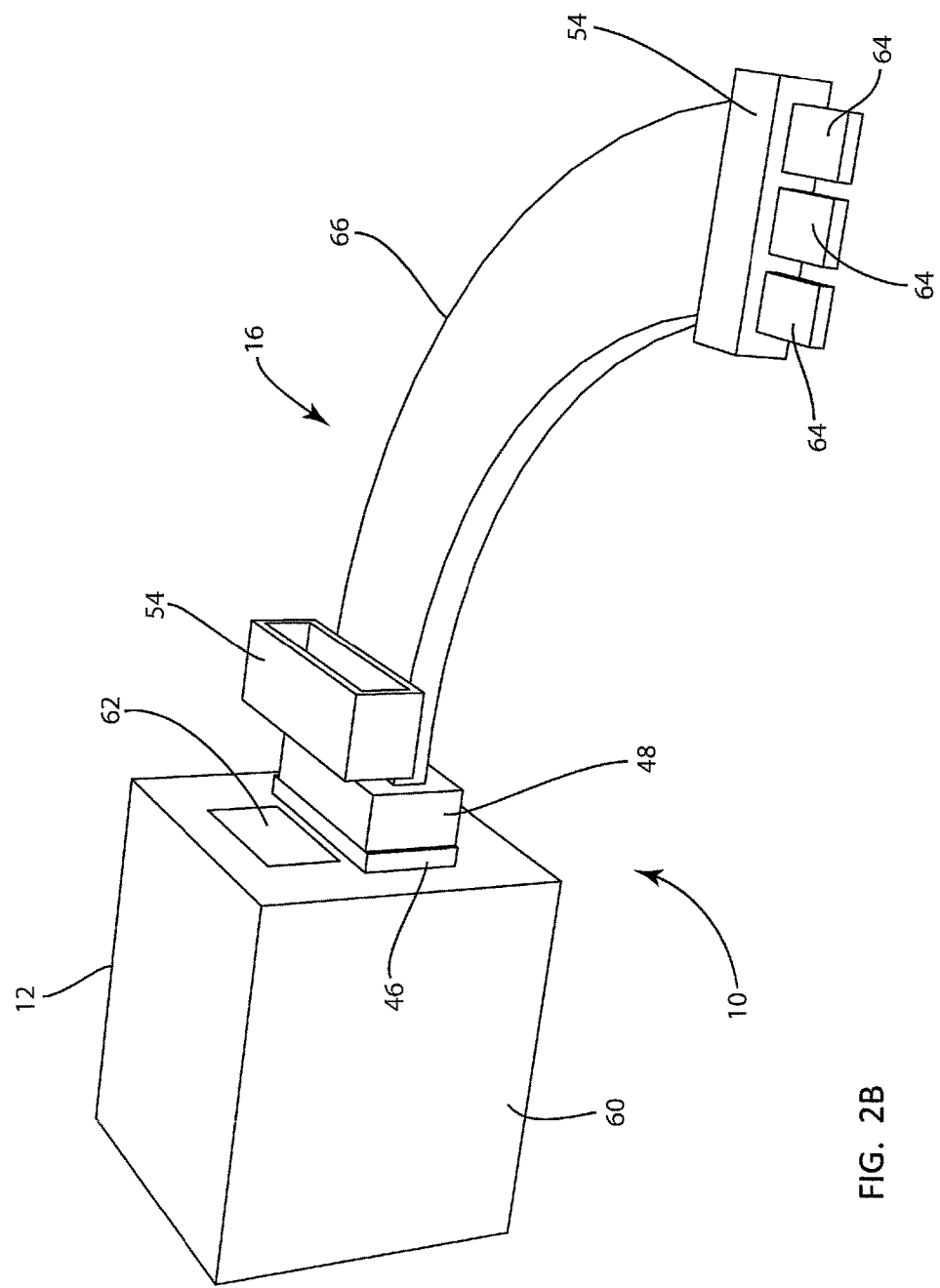
FIG. 2B is an isometric view of the self-powered wireless fuse switch for a three-blade harness assembly.

FIG. 2B is a view similar to FIG. 2A but shows the wireless fuse switch 10 incorporating the three-blade harness assembly 16. The three-blade harness assembly includes the three-blade fuse connector 54 having three individual blades 64 that are received within the three-blade fuse socket 20 of the vehicle electronics system. The fuse connector 54 is mounted on one end of the harness cable 66 while the opposite end of the harness cable 66 includes the harness connector 48. The harness connector 48 is received within the module connector 46 formed as part of the wireless control module 12. A fuse connector 54 is formed as part of the three-blade harness assembly 16 and receives the three-blade fuse removed from the three-blade socket 20 that forms part of the vehicle electronic system.

Figure 3:
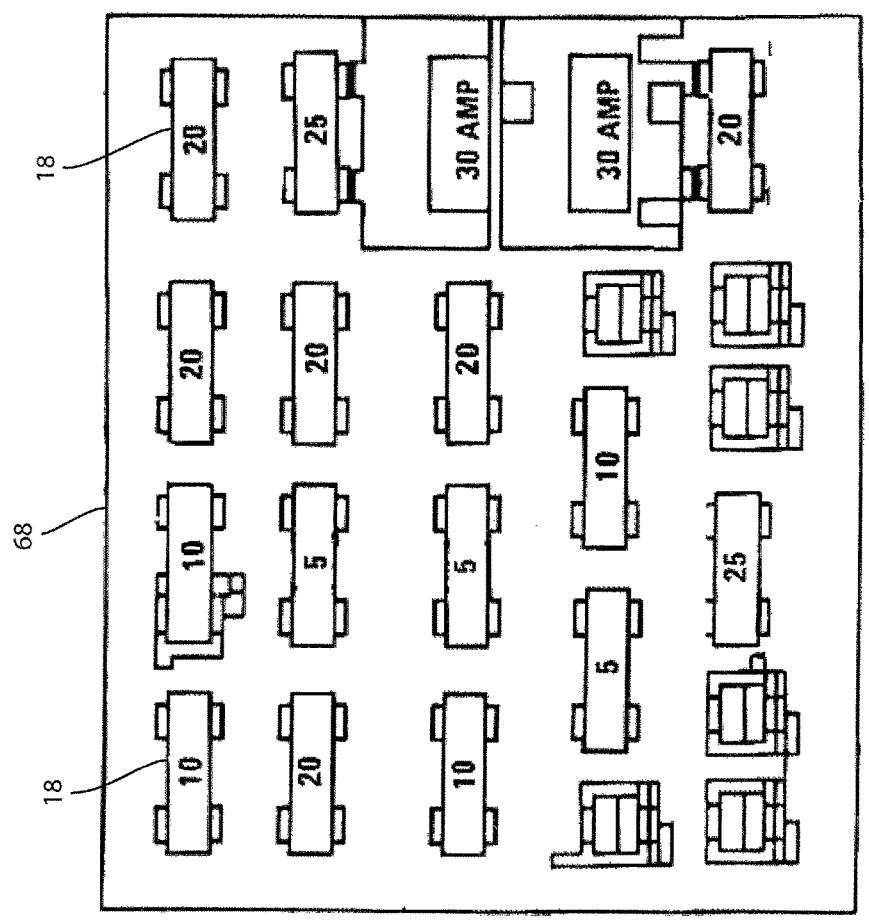
FIG. 3 is a typical vehicle electrical fuse block showing the location of connection points for the harness assembly of FIG. 2A.
Figure 4:
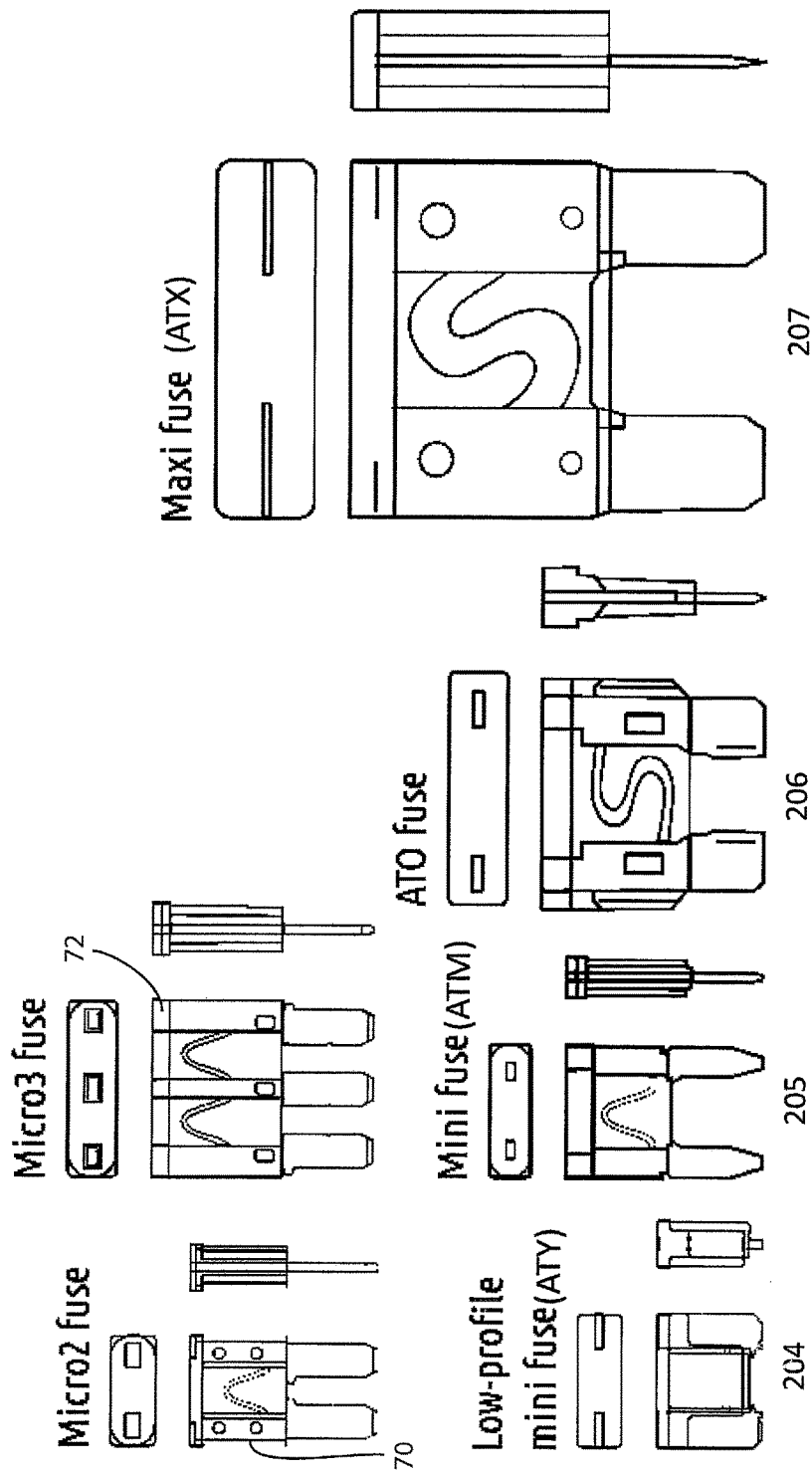
FIG. 4 is an illustration of the different types of automotive vehicle fuses to be supported for the system of FIGS. 2A and 2B.

Referring now to FIG. 3, thereshown is a typical vehicle fuse block 68 that includes a series of two-blade fuse sockets 18 that can receive different types of fuses, such as shown in FIG. 4. The individual fuses shown in FIG. 4 can have various different ratings. The fuses in FIG. 4 include a two-blade fuse 70 and a three-blade fuse 72, as is conventionally utilized within a vehicle electrical system. The fuse block 68 shown in FIG. 3 is typically contained within the engine compartment of a vehicle. However, the location of the fuse block 68 can vary depending upon the individual vehicle.

Referring back to FIG. 1, the vehicle electrical system 22 can include a variety of different electrical subsystems contained within a vehicle. For example, the vehicle electrical system 22 could include a remote starting subsystem, the typical ignition subsystem within the vehicle, which may include a pushbutton start, or other types of standard electronic operating components. Each of the individual subsystems of the vehicle electrical system 22 receives power from the vehicle battery 24 through one of the fuse sockets, such as the two-blade socket 18 or the three-blade socket 20. If the electronic subsystem draws an overcurrent, such as due to an unintentional grounding due to a loose wire or some other malfunction, the fuse contained within either one of the two fuse sockets 18, 20 interrupts electrical power to the device. When the fuse has been blown, the electronic subsystem within the vehicle is rendered inoperative.

The wireless fuse switch 10 operates in the same manner as a conventional fuse. Specifically, when the wireless fuse switch opens, replicating a blown fuse, electrical power from the vehicle battery 24 is interrupted to the subsystem within the vehicle. The wireless fuse switch 10 constructed in accordance with the present disclosure allows a user to selectively replicate an open fuse by controlling the position of the relay 42 contained within the wireless control module 12. When the contact element 44 is open, power from the vehicle battery 24 is interrupted and prevented from reaching the electrical subsystem contained within the vehicle. Likewise, when the contact element 44 is in the closed position shown in FIG. 1, power from the battery 24 can reach the electrical subsystem contained within the vehicle.

As discussed previously, the position of the relay 42 is controlled by the user through the control device 34. If the user desires to change the position of the relay 42, the user can enter such a command through a user interface contained on the control device 34. The RF transceiver contained within the control device 34 sends an electronic, wireless control signal that is received by the antenna 32 contained on the RF transceiver 28 contained within the wireless control module 12. The wireless signal transmitted from the control device 34 to the wireless control module 12 can be relayed utilizing a variety of wireless communication techniques, such as a wireless signal transmitted over the internet. In this manner, the control device 34 can be at a location remote from the vehicle and the installed wireless fuse switch 10 and can be used to selectively control the operation of one of the electrical subsystems of the vehicle electrical system 22.

In other embodiments, the RF transceiver in the control device 34 and RF transceiver and battery monitor 28 could be replaced by power-line carrier (PLC) transceivers to communicate controlling signals over vehicle wiring. Instead of an internal wireless switch module battery 26 which requires periodic replacement, a low-current trickle charger could be powered by current flowing from the vehicle battery to vehicle systems through the wireless switch module 10 to charge either a rechargeable battery or a supercapacitor. Instead of a mechanical bi-stable latching relay 42, a solid-state relay could be substituted if suitable power-handling capabilities were available. Instead of plugging into a two-blade vehicle fuse socket 18 or three-blade fuse socket 20, the self-powered fuse switch could be directly plugged into an available relay socket. With a wireless switch module 10 equipped with multiple relays and with additional fuse connectors in the wiring harness, additional vehicle features could be enabled by using relays to bypass vehicle switches and enable features such a remote engine start to be provided via plug-in fuse replacements.

Referring back to FIGS. 1 and 2A, 2B, the operation of the wireless fuse switch 10 of the present disclosure will now be described. Initially, the user would locate the specific two-blade socket 18 or three-blade socket 20 in the vehicle fuse block for the electrical subsystem of the vehicle that is desired to be externally controlled. Once the fuse socket has been identified, the user removes the fuse from the socket. Once the fuse has been removed, the correct two-blade harness assembly 14 or three-blade harness assembly 16 is inserted into the vehicle fuse socket utilizing either the two-blade connector 58 or the three-blade connector 54.

Once the proper harness assembly has been installed, the removed fuse is installed into either the harness fuse socket 52 or the harness fuse socket 56. In this manner, the removed vehicle fuse remains in the system and will open upon a short circuit condition.

Once the proper harness assembly 14, 16 is installed, the wireless control module 12 is connected utilizing the module connector 46. Once the wireless module 12 is connected, the user can communicate to the wireless module 12 from the control device 34 after completing a first-time pairing procedure. A software application running on the control device 34 allows the control device to communicate to the RF transceiver 28. Commands are passed from the RF transceiver 28 to the relay controller 30 over the relay control line 40. The relay controller 30 would then interpret those commands and send the appropriate relay open or relay closed command to the windings of the bi-stable latching relay 42. The two-blade harness assembly 14 or the three-blade harness assembly 16 will provide the necessary interface to the respective fuse socket that forms part of the vehicle electrical system to either supply or remove the vehicle battery 24 from the fuse-protected vehicle electrical system 22.

Figure 5:
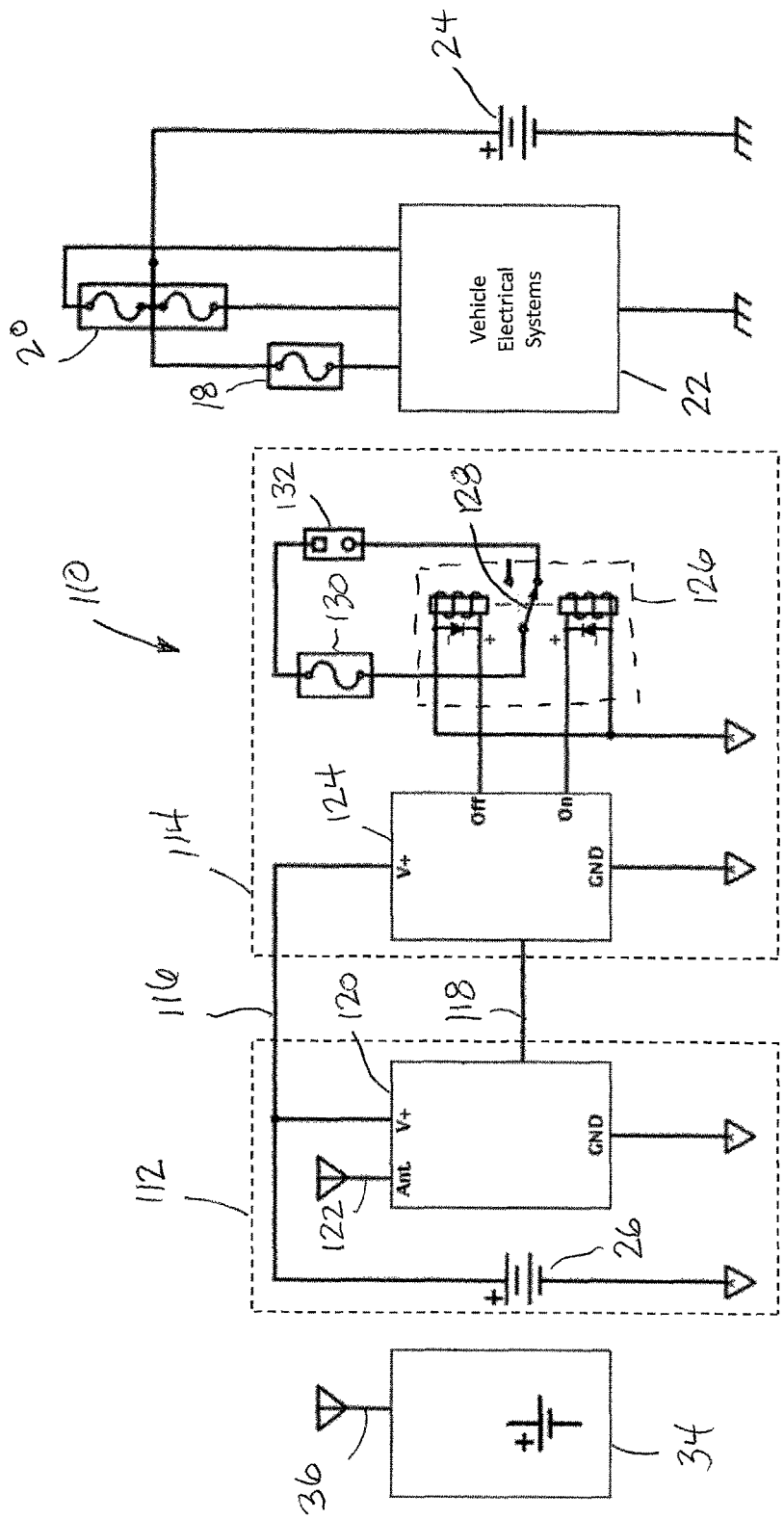
FIG. 5 is a schematic diagram showing the components of a second embodiment of the self-powered wireless fuse switch.

FIG. 5 is a schematic diagram of a self-powered wireless fuse switch 110 constructed in accordance with a second embodiment of the present disclosure. The wireless fuse switch 110 includes many of the same components as the wireless fuse switch 10 shown in FIG. 1. Such like components include common reference numerals for the ease of understanding. The embodiment shown in FIG. 5 is used in connection with vehicle electrical systems 22 that can include the plurality of electrical subsystems described previously. The vehicle electrical systems includes at least one two-blade fuse socket 18 and at least one three-blade fuse socket 20, although it should be understood that the vehicle can and typically will include multiple two-blade and three-blade fuse sockets, where each of the fuse sockets are connected between the vehicle battery 24 and one of the respective electrical subsystems.

In the embodiment shown in FIG. 5, the wireless fuse switch 110 is designed to interact with the control device 34 which may be a wireless mobile device such as a smart phone that includes an internal RF transceiver that is able to transmit wireless control signals through the antenna 36. Unlike the embodiment shown in FIG. 1, the wireless fuse switch 110 includes a separate wireless control module 112 and a separate fuse module 114. The wireless control module 112 and the fuse module 114 communicate through a wired connection as illustrated. The wired connection includes at least a power line 116 and a communication line 118. Although not shown, a ground lead also extends between the wireless control module 112 and the fuse module 114. Additional communication lines could be included between the two separate modules while operating within the scope of the present disclosure.

The wireless control module 112 includes an internal power supply, shown by battery 26, which provides power for the internal operating components contained within the wireless control module 112. The battery 26 provides power for the control module transceiver 120. The control module transceiver 120 includes an antenna 122 that can receive wireless control signals from the external control device 34.

In the embodiment shown in FIG. 5, the fuse module 114 is formed separate from the wireless control module 112 and is connected by the pair of communication lines 118, 116. The fuse module 114 includes a separate outer housing that encloses a relay controller 124. The relay controller 124 receives operating power from power line 116 and is operable to control the position of a relay 126, which is similar to the relay 42 shown in FIG. 1. The relay 126 is a bi-stable latching relay that only requires power briefly to transition to the commanded position (open/closed) and to hold the commanded position indefinitely without the application of any additional power. The internal switching contact element 128 is shown in FIG. 5 in a closed position. In a contemplated alternate embodiment, the relay controller 124 could be replaced by a servo controller and a linear servo motor could be used in place of the relay 126 controlled by solenoids.

In the embodiment shown in FIG. 5, the fuse module 114 includes a fusible link 130 connected between the switching element 128 and the module connector 132. The module connector 132 includes two fuse blades 142a and 142b, shown in FIG. 7. The fusible link 130 functions as a fuse element between the fuse blades since the fuse module 114 will be used in place of a typical fuse in the vehicle electrical system. The module connector 132 shown in FIG. 5 includes two blades configured to replicate a typical automotive fuse such that the entire fuse module 114 can be received within the two-blade fuse socket 18.

Figure 6:
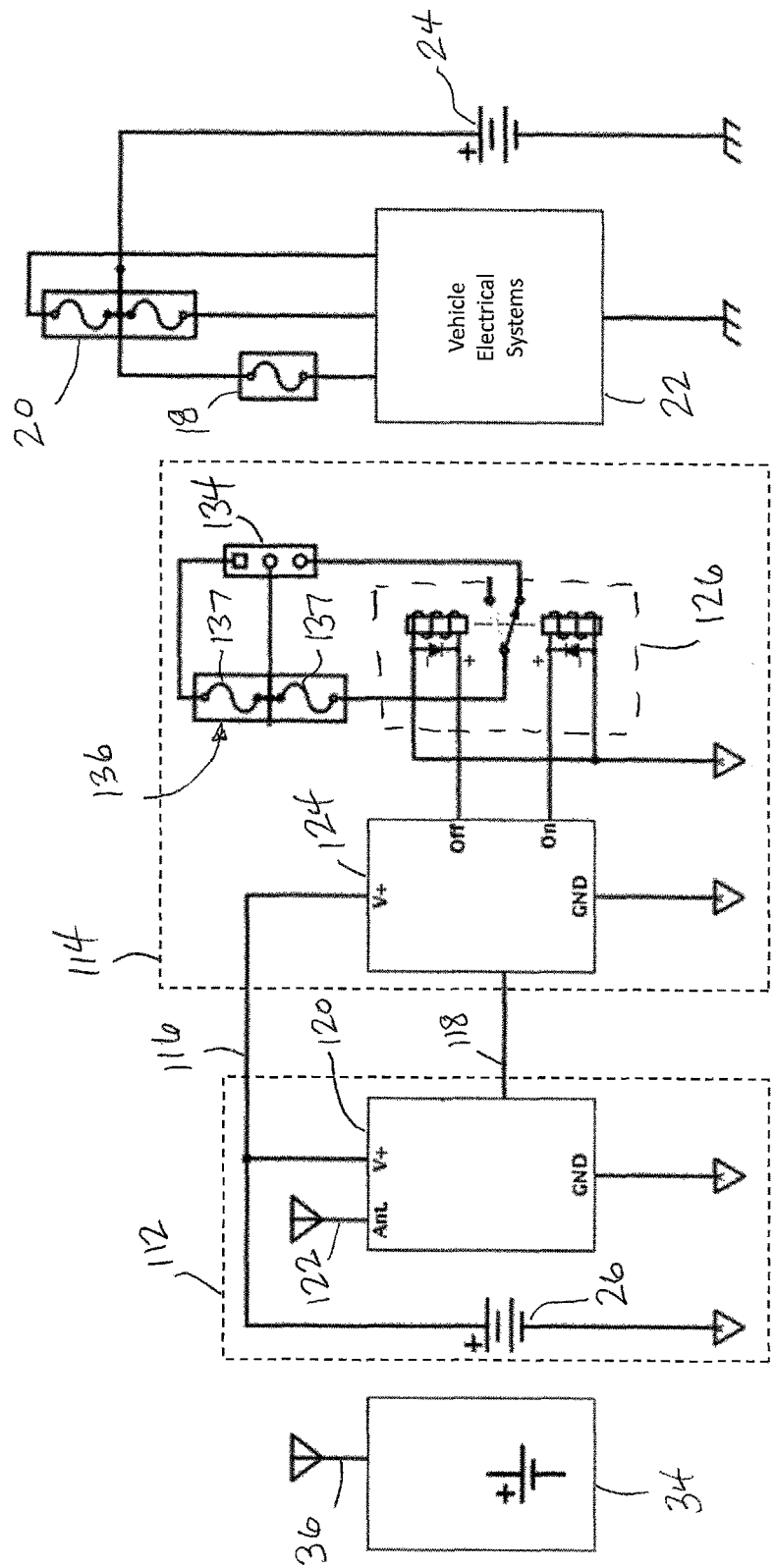
FIG. 6 is a schematic diagram similar to FIG. 5 including a three-blade connector.

FIG. 6 illustrates an alternate embodiment in which the two-blade module connector 132 is replaced with a module connector 134 that is designed having three blades to replicate a typical automotive fuse. The module connector 134 is designed to be received within the three-blade fuse socket 20. In the embodiment shown in FIG. 6, a fusible link 136 having two fuse elements 137 is included within the fuse module 114. The fusible link 136 includes two separate fuse elements 137 as is typical with a three-blade fuse connector.

Figure 7:
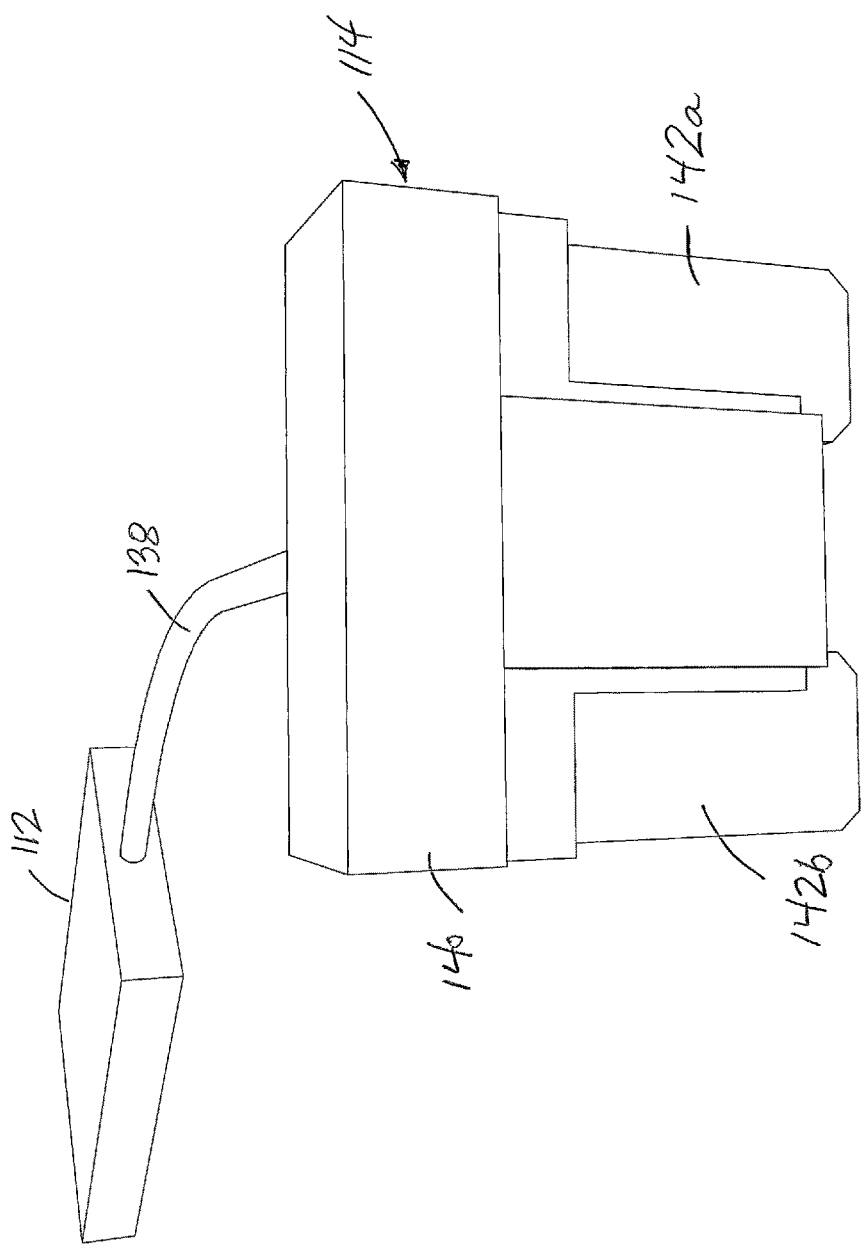
FIG. 7 is an isometric view of the self-powered wireless fuse switch of the second embodiment of the present disclosure.

FIG. 7 illustrates the physical implementation of the schematic system shown in FIG. 5. As shown in FIG. 7, the wireless control module 112 is connected to the fuse module 114 through the cable 138. The cable 138 includes the power line 116 and communication line 118 shown in the embodiments of FIGS. 5 and 6, along with a ground return line.

The fuse module 114 includes an outer housing 140 that is sized to replicate a typical automotive fuse. In the embodiment shown in FIG. 7, a pair of fuse blades 142a and 142b extends from the outer housing 140. The fuse blades 142a, 142b are sized to be received in a conventional fuse socket, such as the two-blade fuse socket 18 shown in FIGS. 5 and 6. The outer housing 140 is formed from a plastic material to provide insulation for the operative components contained within the fuse module 114.

Figure 8:
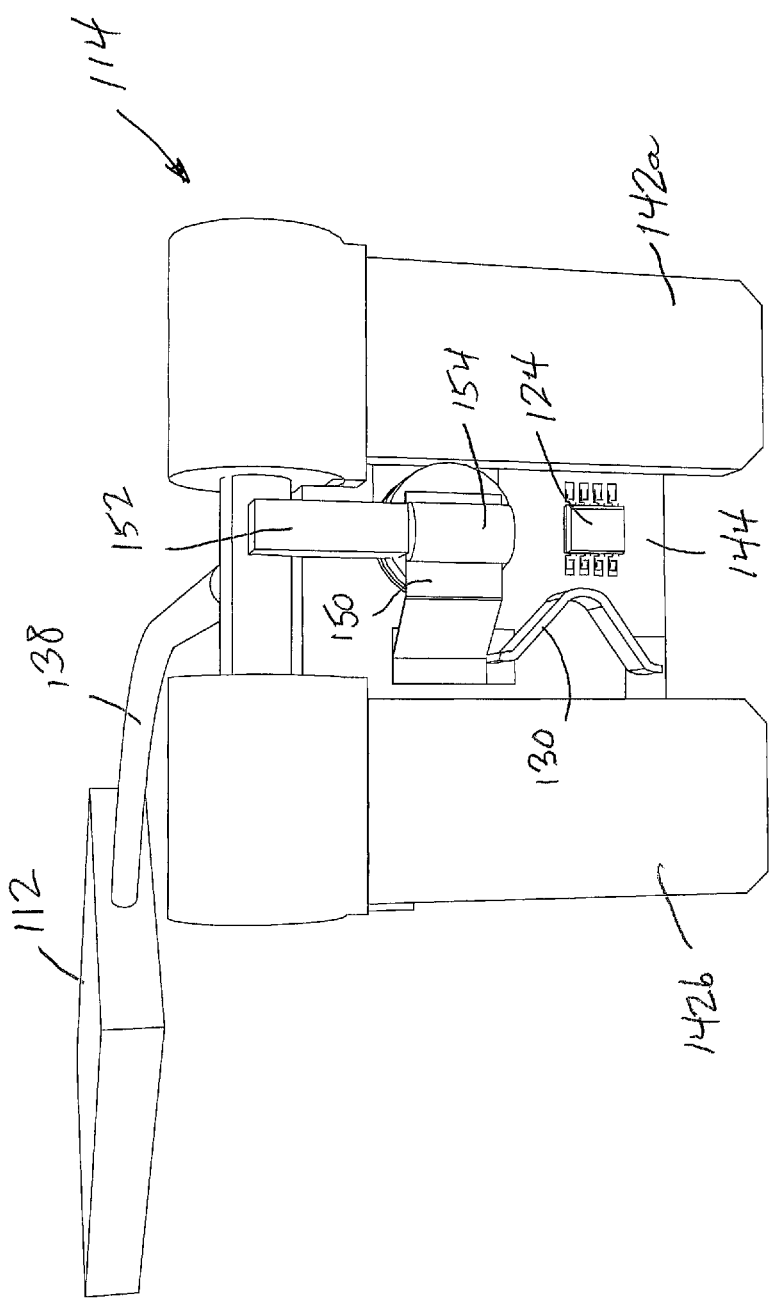
FIG. 8 is an isometric view similar to FIG. 7 with the outer housing of the fuse module removed.
Figure 9:
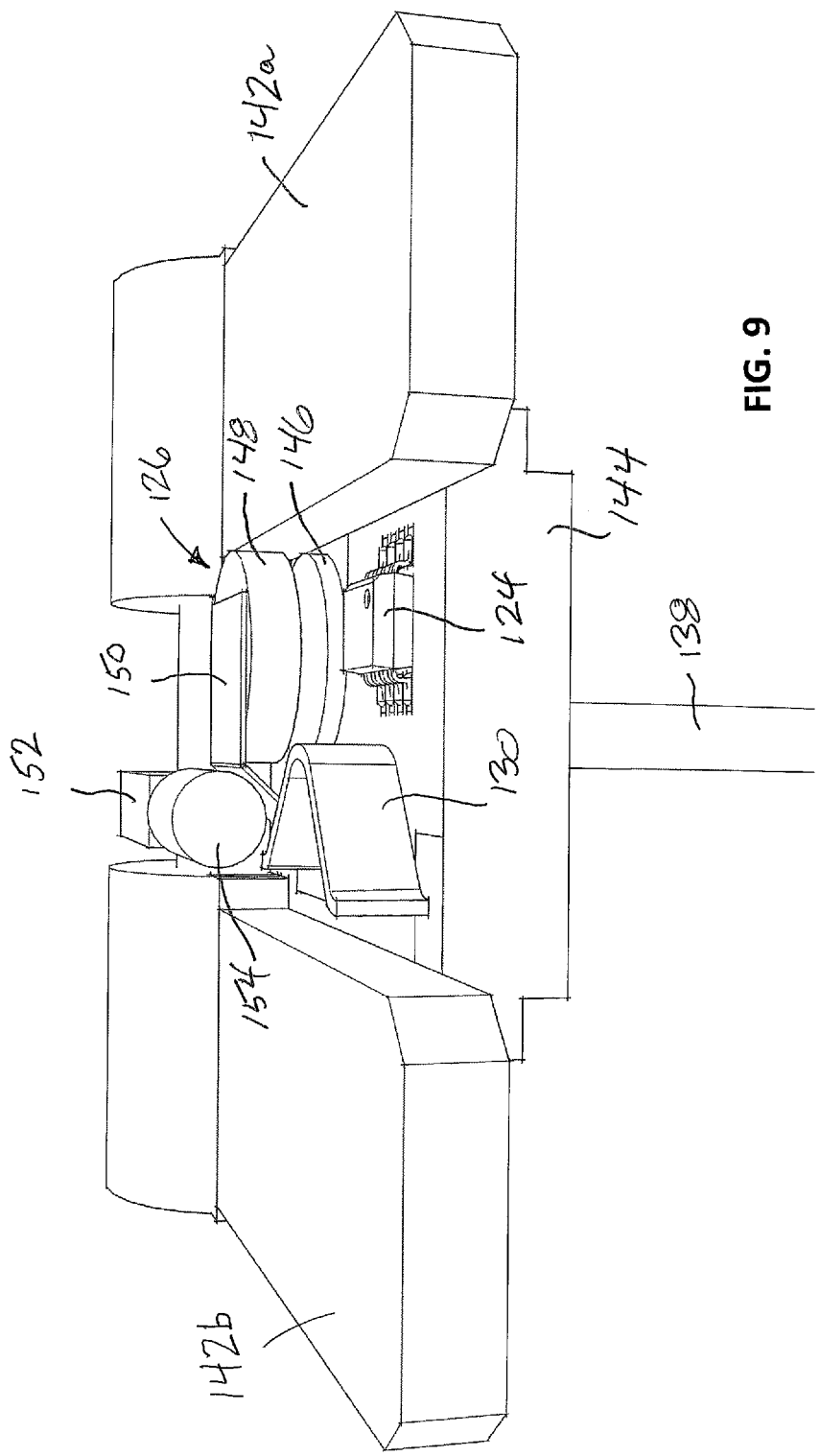
FIG. 9 is an isometric end view of the fuse module shown in FIG. 8.

FIGS. 8 and 9 illustrate the internal components included within the fuse module 114 when the outer housing has been removed. The internal components include a circuit board 144 that provides the electrical mounting for the components within the fuse module 114. These components include the relay controller 124 and the fusible link 130. As can best be seen in FIG. 9, the relay 126 includes a stationary contact 146 mounted to the circuit board 144 and a movable contact 148. The stationary contact 146 and movable contact 148 form the contact element 128 shown in FIG. 5. The movable contact 148 is mounted to a spring element 150. Solenoid 152 includes a moveable actuator 154 that controls the position of the spring element 150 and thus moves the contacts 146, 148 between the open position shown in FIG. 9 and the closed position shown in FIG. 8. In the closed position, the actuator 154 exerts a force on the spring element 150. The operation of the solenoid 152 is controlled by the relay controller 124 such that the relay controller 124 can move the contacts 146, 148 from the open position to the closed position as desired.

The wireless fuse switch 110 shown in FIGS. 5 and 6 operates in the same manner as the wireless fuse switch 10 described previously. However, in the embodiment shown in FIGS. 5 and 6, the fuse module 114 is designed as a separate element from the wireless control module 112. The fuse module 114 is designed to replicate the shape and appearance of a conventional automotive fuse and it can be mounted in the fuse box of the vehicle. The fuse module 114 is connected to the wireless control module 112 through the cable 138. In this manner, the wireless control module 112 can be located a distance away from the fuse module 114. It is intended that the wireless control module 112 could still be located within the vehicle fuse panel but could be in an area with additional room to mount the wireless control module.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for remotely controlling the operation of at least one electrical subsystem that receives power from a vehicle battery through a fuse mounted within a fuse socket of a vehicle electrical system, the system comprising:
    a control device having a transceiver for transmitting control commands;
    a wireless control module including a first outer housing enclosing an internal power supply and a control module transceiver that communicates with the transceiver of the control device to receive the control commands;
    a fuse module connected to the wireless control module to receive control signals from the wireless control module, the fuse module including a second outer housing surrounding a relay controller, a relay movable between an open position and a closed position based upon relay control commands from the relay controller, a plurality of fuse blades extending from the second housing and sized for receipt in the fuse socket of the vehicle electrical system, and a fusible link positioned between the fuse blades; and
    a wired connection between the wireless control module and the fuse module such that the internal power supply provides power to the relay controller and the relay.

2. The system of claim 1 wherein the internal power supply is a battery.

3. The system of claim 1 wherein the relay is a latching relay.

4. The system of claim 1 wherein the wireless control module is in communication with both the control module transceiver and the relay to control the position of the relay based upon the received control commands from the control device transceiver.

5. The system of claim 1 wherein the control device is a smart phone.

6. The system of claim 1 wherein the self-contained fuse module includes either a three fuse blades or two fuse blades.

7. A wireless fuse switch for use with an electrical system of a vehicle having a vehicle battery connected to provide power to at least one electrical subsystem through a fuse contained within a fuse socket, the wireless fuse switch comprising:
    a wireless control module including a first outer housing enclosing an internal power supply and a control module transceiver that receives wireless control commands;
    a fuse module connected to the wireless control module by a wired connection to receive control signals from the wireless control module and to receive power from the internal power supply, the fuse module including a second outer housing;
    a relay controller located within the second outer housing;
    a relay located within the second outer housing, wherein the relay and relay controller are powered by the internal power supply;
    a plurality of fuse blades extending from the second outer housing and sized for receipt in the fuse socket of the vehicle electrical system; and
    a fusible link positioned within the second outer housing between the fuse blades.

8. The wireless fuse switch of claim 7 wherein the relay is a latching relay.

9. The wireless fuse switch of claim 7 wherein the relay controller is in communication with the control module transceiver and the relay to control the position of the relay based upon the received control commands.

10. The wireless fuse switch of claim 7 wherein the fuse module includes either three fuse blades or two fuse blades.

11. A wireless fuse switch for use with an electrical system of a vehicle having a vehicle battery connected to provide power to at least one electrical subsystem through a fuse contained within a fuse socket, the wireless fuse switch comprising:
    a wireless control module including a first outer housing enclosing an internal power supply and a control module transceiver that receives wireless control commands;
    a fuse module connected to the wireless control module by a wired connection to receive control signals from the wireless control module and to receive power from the internal power supply, the fuse module including a second outer housing;
    a controller located within the second outer housing;
    a switching device located within the second outer housing and movable between an open position and a closed position based upon command signals from the controller
    a plurality of fuse blades extending from the second outer housing and sized for receipt in the fuse socket of the vehicle electrical system; and
    a fusible link positioned within the second outer housing between the fuse blades.

12. The wireless fuse switch of claim 11 wherein the switching device is a latching relay.

13. The wireless fuse switch of claim 12 wherein the controller is in communication with the control module transceiver and the latching relay to control the position of the latching relay based upon the received control commands.

14. The wireless fuse switch of claim 11 wherein the fuse module includes either three fuse blades or two fuse blades.

* * * * *